(12) United States Patent
Wollborn

(10) Patent No.: US 8,521,898 B2
(45) Date of Patent: Aug. 27, 2013

(54) METHOD FOR STRUCTURING A BITSTREAM FOR BINARY MULTIMEDIA DESCRIPTIONS AND A METHOD FOR PARSING THIS BITSTREAM

(75) Inventor: Michael Wollborn, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 2409 days.

(21) Appl. No.: 10/399,633

(22) PCT Filed: Sep. 29, 2001

(86) PCT No.: PCT/IB01/02756
§ 371 (c)(1),
(2), (4) Date: Sep. 17, 2003

(87) PCT Pub. No.: WO02/03974
PCT Pub. Date: May 16, 2002

(65) Prior Publication Data
US 2004/0057466 A1    Mar. 25, 2004

(30) Foreign Application Priority Data
Oct. 20, 2000 (DE) .................................. 001 22 841

(51) Int. Cl.
*G06F 15/16* (2006.01)
(52) U.S. Cl.
USPC ................. 709/231; 375/240.23; 375/240.26
(58) Field of Classification Search
USPC ................. 709/231, 232, 236, 237, 238, 245, 709/246; 375/240.23, 240.26
See application file for complete search history.

(56) References Cited

U.S. PATENT DOCUMENTS

| | | | |
|---|---|---|---|
| 6,393,196 B1 * | 5/2002 | Yamane et al. | 386/52 |
| 6,593,936 B1 * | 7/2003 | Huang et al. | 345/619 |
| 6,751,623 B1 * | 6/2004 | Basso et al. | 707/101 |
| 7,185,049 B1 * | 2/2007 | Benitez et al. | 709/203 |
| 2004/0024898 A1 * | 2/2004 | Wan | 709/231 |

FOREIGN PATENT DOCUMENTS

| | | |
|---|---|---|
| EP | 11 58 420 | 11/2001 |
| JP | 2003-534752 | 11/2003 |
| WO | WO 98/21889 | 5/1988 |

OTHER PUBLICATIONS

"Text of ISO/IEC FCD 1593801 Information Technology—Multimedia Content Description Interface—Part 1 Systems" ISO/IEC JTC1/SC29/WG11 MPEG01/N4001, Mar. 2001, pp. 1-2,I-V, 6-58.
J. Martinez, "Overview of the MPEG-7 Standard".
"Core Experiment Description for Binary and Dynamic MPEG-7 Data Representation" ISO/IEC JTC1/SC29/WG11, Jul. 2000.
O. Avaro et al.,"Systems Working Draft 0.5—Information Technology—Multimedia Content Description Interface—Part 1: Systems" ISO/IEC JTC1/SC29/WG11/N3390, May 2000.
Wireless Application Protocol Forum: "WAP Binary XML Content Format", WAP Binary XML Content Format Document ID WAP-192-WBXML-20000515 Version 1.3, pp. 1-25.

(Continued)

*Primary Examiner* — Dhairya A Patel
(74) *Attorney, Agent, or Firm* — Kenyon & Kenyon LLP

(57) ABSTRACT

For structuring a bitstream for binary multimedia descriptions, binary identifiers (BIDs) are positioned on at least one regular positioning grid. Parsing is performed by checking these binary identifiers (BIDs) on the positions defined by the positioning grid.

14 Claims, 1 Drawing Sheet

(56) References Cited

OTHER PUBLICATIONS

Benoit Mory; Nicolas Santini; Franck Laffargue: "Binary format for MPEG-7 descriptions (BiM): a new approach", International Organisation for Standardisation ISO/IEC JTC/SC29/WG11 Coding of Moving Pictures and Audio, M6585, Oct. 18, 2000, pp. 1-21, XP030035733.

List of Ad-Hoc Groups Established at the 52$^{nd}$ Meeting in Geneva, ISO/IEG JTC1/SC29/WG11/N3375, Jun. 2000, URL, http://nipeg.chiariglione.org/meetings/geneva/geneva_ahg.htm.

* cited by examiner

METHOD FOR STRUCTURING A BITSTREAM FOR BINARY MULTIMEDIA DESCRIPTIONS AND A METHOD FOR PARSING THIS BITSTREAM

FIELD OF THE INVENTION

The present invention relates to multimedia descriptions, and in particular relates to a method for structuring a bitstream of binary multimedia descriptions and a method for parsing such a bitstream.

BACKGROUND INFORMATION

Methods for structuring a bitstream for binary multimedia descriptions use a textural representation of the description structures for the description of audio-visual data content in multimedia environments (for example, as described in MPEG-7 overview (version 3.0), ISO/IEC ITC1/SC29/WG11 N3445 Geneva, May/June 2000, pages 1 to 53). For this task a so-called description definition language (DLL) is used, which is derived from the Extensible Markup Language (XML). An MPEG-7 description consists of descriptors (D) or description schemes (DS), where the number of description elements can be variable. In the MPEG input document M6061 (from the Geneva meeting), a binary format for the MPEG-7 data has been proposed, which allows a more compact encoding of description structures and thus savings in storage capacity and/or transmission bandwidth. However, it is noted that in these methods, there are no specifications as to which positions in a bitstream binary identifiers (BIDs) representing opening and closing tags of a multimedia description are placed. Therefore, a binary parser has to check each possible position of a bitstream sequentially, until a respective BID is found.

SUMMARY OF THE INVENTION

An exemplary binary bitstream structure for binary multimedia descriptions is provided that allows fast parsing of the bitstream while requiring a very low complexity for a binary parser. By means of the exemplary method of the present invention, a structure for the bitstream is specified which defines a grid of positions in the bitstreams where BIDs may be placed. On all other positions, a BID does not start. Depending on the bit-stream, this structure allows to speed up the parsing process, since the number of positions to check for a parser is reduced significantly. The parser knows already where to look for respective tags. The parser only needs to check the binary identifiers (BIDs) on the positions defined by the positioning grid. Accordingly, the computational complexity required for the binary parser is reduced.

The exemplary method of the present invention also provides an exemplary method for allowing a binary parser to skip over a complete sub-description without having to parse the complete corresponding part of the bitstream. This may be achieved by assigning the same unique number to each opening binary identifier and closing binary identifier of the same type.

According to another exemplary method, for some applications that use binary descriptions of multimedia data, a complete sub-description of the overall description may be skipped if the application does not use the specific part of the information in the sub-description. According to the exemplary method, a binary parser can skip a complete sub-description by searching for the closing BID with the same unique number as the opening BID of the relevant D or DS.

By this, the parsing speed for skipping sub-descriptions is increased, and also the computational complexity of the parser is reduced.

DETAILED DESCRIPTION

Figure 1:
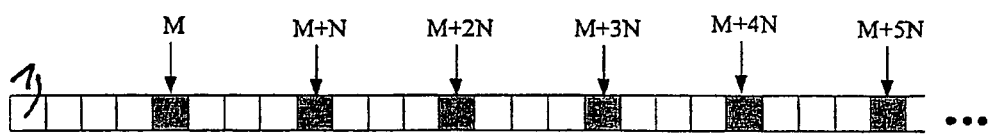
FIG. 1 shows an exemplary bitstream structure with identical grid positions for opening and closing BIDs.

As used herein, in accordance with definitions in MPEG-7:

"Data" is defined as audio-visual information regardless of storage, coding, display, transmission, medium, or technology.

A "feature" is a distinctive characteristic of the data.

A "Descriptor" (D) is a representation of a feature and defines the syntax and the semantics of the feature representation.

A "Description Scheme (DS)" specifies the structure and semantics of the relationships between its components, which may be both Descriptors (Ds) and Description Schemes (Dss).

A "Description Definition Language" (DDL) is a language that allows the creation of new Description Schemes and, possibly, Descriptors. It also allows the extension and modification of existing Description Schemes.

A "D/DS schema" is the definition of a D/DS using the DDL, which is based on the XML-schema language. Here, the components of a specific D/DS, which may themselves be other Ds/DSs, and their relationships are defined.

A "D/DS instance" os the instantiation of a certain D/DS, i.e. the description of actual data according to the elements defined in the D/DS schema.

A "Coded Description" is a description that has been encoded to fulfil relevant requirements such as compression efficiency, error resilience, random access, etc.

A "Static DS" is a DS that has been specified from the beginning and that is contained in a known dictionary of Ds and DSs.

A "Dynamic DS" is a DS that is dynamically defined, using available static Ds and Dss.

Two ways to represent a D/DS instance include either as text using the XML language, or in binary form. In M6061, a possible binary form for the descriptions is described. It consists mainly of binary identifiers (BIDs), which are unique for each possible D or DS, and which can be hierarchically structured in order to improve the parsing on bitstream level.

An example of a simple DS in textual form is given below:

```
<VideoSegment id = "VS1">
    <MediaTime timeunit ="PT1N3 OF">
        <MediaIncrTimePoint>0</MediaIncrTimePoint>
        <MediaIncrDuration>106 </MediaIncrDuration>
    </MediaTime>
    <GoFGoPHistogramD HistogramTypeInfo="Average">
        <ColorHistogramD>
            <ColorSpaceD Space=".HSV" />
            <LinearColorQuantizationD Quantization="linear">
                <bin number>4</bin number>
                <bin number>4</bin number>
                <bin number>4</bin number>
            </LinearCol. orQuantizationD>
            <HistogramD HistogramNormFactor="1"
            NumberHistogramBins="4">
```

-continued

```
        <HistogramValue>444</HistogramValue>
        <HistogramValue>34 </HistogramValue>
        <HistogramValue>58</HistogramValue>
        <HistogramValue>564</HistogramValue>
        </HistogramD>
      </ColorHistogramD>
    </GoFGoPHistogramD>
    <SegmentDecomposition Gap="true" Overlap="false"
DecompositionType="spatio-temporal">
      <MovingRegion id="MR2">
        <MediaTime timeunit="PT1N30F">
          <MediaIncrTimePoint>53</MediaIncrTimepoint>
          <Media IncrDuration>23</MediaIncrDuration>
        </MediaTime>
        <ParametricobjectMotion Xorigin="0.000000"
Yorigin="0. 000000"
        ModelType="2">
          <MotionParameters>0.000000</MotionParameters>
          <MotionParameters>0.000000</MotionParameters>
          <MotionParameters>0.000000</MotionParameters>
          <MotionParameters>0.000000</MotionParameters>
          <MotionParameters>0.000000</MotionParameters>
          <MotionParameters>0.000000</MotionParameters>
        </ParametricobjectMotion>
      </MovingRegion>
    </SegmentDecomposition>
</VideoSegment>
```

The elements between the brackets "<...>" are referred to as XML-tags. In general, to each "opening tag" there corresponds a "closing tag", which has the same name but with a leading "/" at the beginning. As an example, the closing tag for "<MediaTime>" would be "</MediaTime>". The meaning of the tags and thus of the Ds or DSs described by them is defined by the D or DS schema using the DDL. In the binary form described in M6061, a unique binary identifier (BID) is assigned to each such tag of a pre-defined set of tags according to a set of specified Ds and DSs. In order to make parsing on binary level more robust, the BIDS can comprise a leading sequence of bits which is unique in the bitstream, i.e. can not occur at other places than in BIDs. Using the so specified BIDs, the text form can be mapped into binary form by replacing each opening and closing tag by the respective BID, using e.g. a leading "0" or "1" to mark if the BID represents an opening or a closing tag. The other values, i.e. the actual data like the "0.0000" for the motion parameters or the numbers in the histogram values can be represented by usual integer, float or ASCII text representation. Up to date, the BIDs representing the opening and closing tags can be placed anywhere in the bitstream, depending on the size of the actual data in between the tags.

The exemplary method of the present invention provides a structure for a bitstream representing descriptions of multimedia data. This structure defines a regular grid of positions, at which the opening and closing tags corresponding to the XML-tags of Ds and DSs may be placed. In the present invention, three aspects can be distinguished:

Specification of positioning grid for opening and closing BIDs in a bitstream;

Specification of different positioning grids for opening and for closing BIDS; and Unique numbering of opening and corresponding closing BIDs.

Each of the aspects and the proposed solution in the light of the present invention will be described in the following.

A binary identifier BID for each specified descriptor D and description scheme DS is used to replace the originally textual (XML) opening and closing tag of the D or DS. In this respect, the BIDs are referred to as opening and closing BIDs. The opening and closing BID of a specific D or DS are mainly identical and differ just in that e.g. a leading/trailing "0" or "1" denotes if it is an opening or a closing BID.

According to one aspect of the exemplary method of the present invention, a special structure for the bitstream is defined, in which opening or closing BIDs may only start at certain positions. Such a structure and corresponding grid is shown in FIG. 1. Here, the first BID may start at bit number M (M>0), and from there on BIDs may start at each following Nth bit (with N>1) until the end of the bitstream. For example, if M=1 and N=8, BIDs would always start at the beginning of a new byte in the bitstream. The parameters M and N may be fixed in a respective specification, or they may alternatively be transmitted in at the very beginning of the bitstream in its so-called header 1. By the latter approach, it is possible to adapt the parameters to possible specific application requirements.

In the case that there is only one positioning grid defined for opening and for closing BIDs, at those positions both kind of BIDs may start. Therefore, the opening and closing BIDs must be distinguished, e.g. by a leading or trailing "0" and "1", respectively, in order to distinguish them at the parser.

Figure 2:
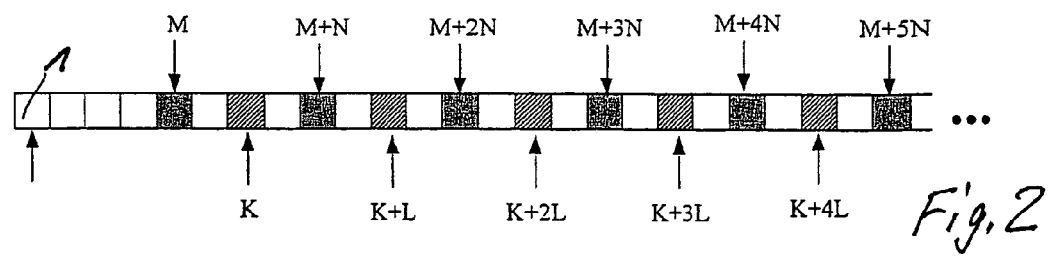
FIG. 2 shows an exemplary structure of a bitstream with separate grid positions for opening and closing BIDs.

According to another aspect of the exemplary method of the present invention, different grids for opening BIDs and for closing BIDs are specified. The grids are defined such that the occurrence of an opening BID at a closing grid position is not possible, and vice versa. Thus, the same BID can be used for an opening and a closing tag, without having to mark it as such with a leading or trailing bit. A corresponding structure and two respective grids, are shown in FIG. 2. Here, the first opening BID may start at bit number M (M>0), and from then on at each following Nth bit (N>1), as already the case in FIG. 1. However, at those positions no closing tag must start. The first closing tag may start at bit number K (K>M), and from then on at each following Lth bit (L>1). The parameters M, K, N and L may be chosen such that the grids do not interfere with each other. All parameters may again be fixed in a respective specification, or they may alternatively be transmitted in at the very beginning of the bitstream in its header 1.

Besides the aspects of just parsing a bitstream representing multimedia descriptions, it may be very helpful for a parser if it could skip complete sub-descriptions of an overall description, without having to parse the complete corresponding part of the bitstream. For example, this could be the case if the part to skip contains information which the application that consumes the description is not interested in, while it may be very well interested in information beyond or past that sub-description. In the current textual form, the complete sub-description has to be parsed.

According to yet another aspect of the exemplary method of the present invention, however, a whole sub-description may be skipped without parsing the corresponding bitstream completely. Therefore, a unique number is assigned to each opening BID of the same type, i.e. corresponding to the same D or DS. The same unique number is assigned to the corresponding closing tag of the respective sub-description. The unique numbers are added to the opening and closing BID as fixed or variable length codes, and written into the bitstream. A parser can now skip a complete sub-description, by searching for the closing BID with the corresponding unique number, instead of parsing the whole corresponding part of the bitstream.

The invention claimed is:

1. A method for structuring a bitstream for a binary multimedia description in which binary identifiers representing opening tags and closing tags of at least one of descriptors and description schemes are used, the method comprising:

positioning binary identifiers on at least one regular positioning grid within the bitstream, wherein the at least one regular positioning grid limits a number of possible positions for positioning the binary identifiers;

assigning a unique number to each opening binary identifier corresponding to a same descriptor or description scheme;

assigning the unique number to each corresponding closing binary identifier; and parsing the bitstream by only checking the binary identifiers on positions defined by the at least one regular positioning grid.

2. The method of claim 1, further comprising:

providing a single regular positioning grid for the opening binary identifiers and the closing binary identifiers; and marking the opening binary identifiers and closing binary identifiers to distinguish them during a parsing of the bitstream.

3. The method of claim 2, wherein a first binary identifier starts at bit number M in the bitstream, where M is greater than zero, and following binary identifiers start at each following Nth bit, where N is greater than 1.

4. The method of claim 1, further comprising:

providing a first positioning grid for the opening binary identifiers and a second positioning grid for the closing binary identifiers; and structuring the first and second positioning grids, which are different, so that they do not interfere with each other.

5. The method of claim 4, wherein a first opening binary identifier starts at a bit number M in the bitstream and following opening binary identifiers start at each following Nth bit, where N is greater than 1, and wherein a first closing binary identifier starts at bit number K, where K is greater than M and following closing bnary identifiers start at each following Lth bit, where L is greater than 1.

6. The method of claim 5, wherein M, K, N and L are chosen so that the first positioning grid and second positioning grid do not interfere with each other.

7. The method of claim 5, wherein M, N, K and L are predetermined fixed parameters.

8. The method of claim 5, wherein M, N, K and L are adaptively selectable and transmitted at a beginning of the bitstream.

9. The method of claim 8, wherein M, N, K and L are adaptively selectable and transmitted in a header.

10. The method of claim 1, further comprising:

adding assigned unique numbers to each opening binary identifier and closing binary identifier as a fixed length code or a variable length code; and writing the fixed length code or variable length code into the bitstream.

11. The method of claim 1, a further comprising:

parsing the bitstream by searching for corresponding unique numbers for opening binary identifiers and closing binary identifiers in the bitstream, where the parser wants to skip a complete sub-description.

12. The method of claim 1, further comprising:

adding assigned unique numbers to each opening binary identifier and closing binary identifier as a fixed length code or a variable length code;

writing the fixed length code or variable length code into the bitstream; and parsing the bitstream by searching for corresponding unique numbers for opening binary identifiers and closing binary identifiers in the bitstream, where the parser wants to skip a complete sub-description.

13. The method of claim 12, further comprising:

providing a single regular positioning grid for opening binary identifiers and closing binary identifiers; and marking the opening binary identifiers and closing binary identifiers to distinguish them during a parsing of the bitstream;

wherein a first binary identifier starts at bit number M in the bitstream, where M is greater than zero, and following binary identifiers start at each following Nth bit, where N is greater than 1.

14. The method of claim 12, further comprising:

providing a first positioning grid for opening binary identifiers and a second positioning grid for closing binary identifiers; and structuring the first and second positioning grids, which are different, so that they do not interfere with each other;

wherein a first opening binary identifier starts at a bit number M in the bitstream and following opening binary identifiers start at each following Nth bit, where N is greater than 1, and wherein a first closing binary identifier starts at bit number K, where K is greater than M and following closing bnary identifiers start at each following Lth bit, where L is greater than 1.

* * * * *

UNITED STATES PATENT AND TRADEMARK OFFICE
CERTIFICATE OF CORRECTION

PATENT NO. : 8,521,898 B2
APPLICATION NO. : 10/399633
DATED : August 27, 2013
INVENTOR(S) : Michael Wollborn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2435 days.

Signed and Sealed this

Fifteenth Day of September, 2015

Michelle K. Lee
*Director of the United States Patent and Trademark Office*